United States Patent [19]

Alexander et al.

[11] Patent Number: 5,587,829
[45] Date of Patent: Dec. 24, 1996

[54] METHOD AND APPARATUS FOR SIGNAL FILTERING

[75] Inventors: Edward M. Alexander, Falls Church, Va.; Anthony E. Spezio, Laurel, Md.

[73] Assignee: The United States of America as represented by the Secretary of the Navy, Washington, D.C.

[21] Appl. No.: 296,883

[22] Filed: Aug. 29, 1994

[51] Int. Cl.[6] ........................................... G02F 1/11
[52] U.S. Cl. ..................... 359/287; 359/285; 359/298; 359/559; 359/308; 364/822; 364/827; 342/368
[58] Field of Search ........................... 359/287, 298, 359/559, 285, 305, 308, 312; 364/822, 827, 576; 342/368, 424; 250/227.12, 227.27; 356/345

[56] References Cited

U.S. PATENT DOCUMENTS

| | | | |
|---|---|---|---|
| 3,492,635 | 1/1970 | Farr . | |
| 3,872,293 | 3/1975 | Green . | |
| 4,389,093 | 6/1983 | Jackson | 359/298 |
| 4,522,466 | 6/1985 | Linding et al. | 359/308 |
| 4,530,573 | 7/1985 | Wolkstein | 359/305 |
| 4,531,196 | 7/1985 | Lin | 364/827 |
| 4,645,300 | 2/1987 | Brandstetter et al. | 359/308 |
| 4,697,926 | 10/1987 | Youngquist et al. | 356/345 |
| 4,770,535 | 9/1988 | Kim et al. | 359/345 |
| 5,008,851 | 4/1991 | Brandstetter et al. | 359/305 |
| 5,363,221 | 11/1994 | Sutton et al. | 359/298 |

*Primary Examiner*—Loha Ben
*Attorney, Agent, or Firm*—Thomas E. McDonnell; Edward Miles

[57] ABSTRACT

A signal filter, and method of signal filtering, in which an optical signal is spatially dispersed according to frequency, and undesired frequencies blocked out. In an embodiment, a Bragg cell receives a (typically microwave) signal, and transduces it to an acoustic signal. A light source, e.g. a laser diode, directs light through the acoustic signal in a known manner so as to produce an optical output which is spatially dispersed according to frequency. A programmable spatial light modulator blocks out unwanted frequency components. Upon removal of the optical carrier, e.g. by heterodyning the spatial light modulator's output with a reference signal from the light source, the components can be recombined into a resultant filtered signal. The invention can be used as a repeater, a military electronic countermeasure, in environments which have large amounts of electromagnetic clutter but in which one does not want the clutter repeated. The spatial light modulator can be programmed to pass only frequency components in which one is interested, thus blocking the clutter from the repeated signal.

16 Claims, 4 Drawing Sheets

METHOD AND APPARATUS FOR SIGNAL FILTERING

BACKGROUND OF THE INVENTION

Signal repeaters have many applications, among which is as an electronic countermeasure. Such a countermeasure retransmits delayed pulses of a hostile radar at the same frequency, pulse repetition interval, and pulse width, back towards the radar. The hostile radar perceives these repeated pulses as authentic targets, obscuring the real target in a multitude of false echoes.

A problem arises when these repeaters are used in environments which have strong interfering signals, such as from jammers and fire control systems. These clutter signals will saturate or capture the repeater, effectively disabling it. Current repeater countermeasure systems use two techniques for operating in dense or interfering environments. Reducing the sensitivity of the repeater also reduces the clutter below the repeater's threshold. But this may also reduce the threat signal from the hostile radar below the repeater's threshold also. Another approach uses a serial chain of tunable notch filters at the repeater's input antenna, which attenuate undesired frequencies. The repeater is then insensitive to threat signals in the notched segment of the repeater bandwidth. These filters are set to remove frequencies that typically appear in interfering environments. But each filter adds significant loss to the received signals. The penalty for this technique is reduced bandwidth and dynamic range.

SUMMARY OF THE INVENTION

Accordingly, an object of the invention is to filter clutter signals from signals of interest.

Another object is to do this without having to markedly reduce the sensitivity of the system in which the filter is employed, in order to screen out the clutter.

Another object is to do the foregoing without resort to notch filters, or the like.

Another object is to do the foregoing in a manner useable as a repeater suitable for military electronic countermeasures.

In accordance with these and other objects made apparent hereinafter, the invention concerns a method and apparatus for filtering a signal, which involves spatially dispersing the input signal according to frequency to form a spatially dispersed optical signal, and combining selected frequency components of the spatially dispersed signal into a resultant filtered signal. By so doing, one effectively removes signals in unwanted bandwidths, i.e. clutter, without having to attenuate the input signal any more than the insertion losses of the system. In an embodiment of the invention, the dispersive element is a Bragg cell, and the screen which selects the frequency components to be combined is a computer programmable spatial light modulator. This optical technology provides the speed and bandwidth necessary for use on a modern battlefield.

These and other objects, features, and advantages of the invention, are further understood from the following detailed description of particular embodiments of the invention. It is understood, however, that the invention is capable of extended application beyond the precise details of these embodiments. Changes and modifications can be made to the embodiments that do not affect the spirit of the invention, nor exceed its scope, as expressed in the appended claims.

The embodiments are described with particular reference to the accompanying drawings, wherein:

DETAILED DESCRIPTION

Figure 1:
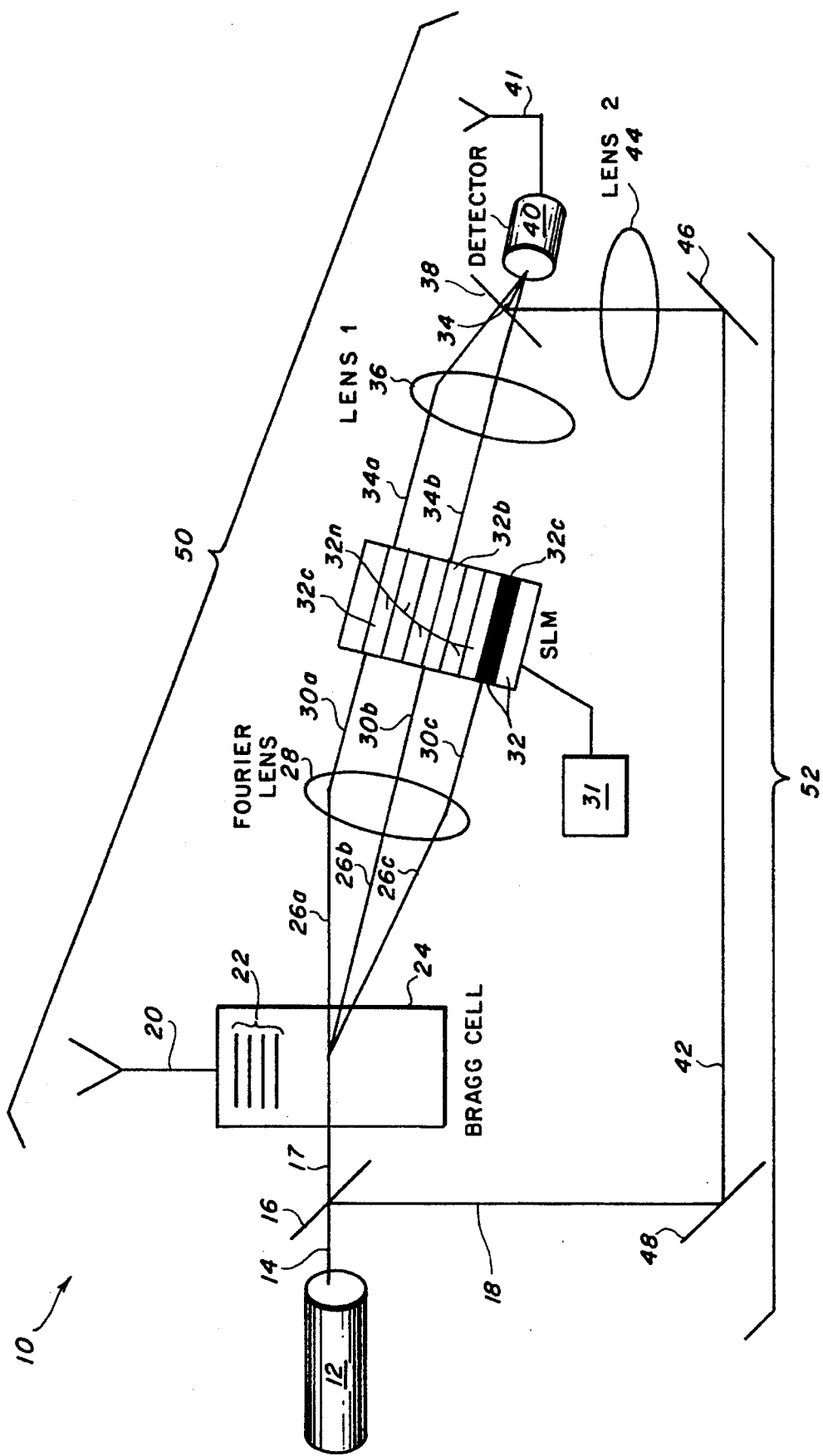
FIG. 1 is a schematic diagram illustrating an embodiment of the invention.

With reference to the drawing figures, wherein like numbers indicate like parts throughout the several views, FIG. 1 shows an embodiment 10 according to the invention. Laser 12, preferably a laser diode, emits optical signal 14 to beam splitter 16 which splits signal 14 into two arms 17, 18, which are directed into respective arms 50, 52 of the system. Arm 50 contains Bragg cell 24, an electro-optical transducer which receives a (typically) RF signal via antenna 20, and transduces it into a corresponding acoustic signal 22. Bragg cell 24 has a crystal of acousto-optically active material, which permits acoustic signal 22 and beam 17 to interact. The transducer between antenna 20 and cell 24 (not shown) can be any conventional electro-acoustic device, for example a piezoelectric transducer.

As acoustic wave 22 propagates through Bragg cell 24, the varying pressure intensity which wave 22 induces correspondingly modulates the index of refraction of the acousto-optic crystal, effectively setting up weak diffraction gratings in the line of sight of beam 17, the spacing of the diffraction gratings being the spatial wavelength of wave 22. (If the input signal is spectrally complex or has a varying amplitude, the spacing and intensity of wave 22 will be correspondingly complex and varying, with consequences discussed below.) In accordance with known principles, this diffraction grating interacts with beam 17, deflecting part of it and passing part of it directly. The respective intensities of the deflected and passed portions of beam 17 depend linearly on the pressure intensity of wave 22 as beam 17 hits it. Also in accordance with known principles, Bragg cell 24 frequency modulates the deflected portions of beam 17, with the deflection angle being linearly proportional to frequency. Deflected portions of beam 17, shown as beams 26 in FIG. 1, thus correspond to the signal received by antenna 20, modulated onto an optical carrier at the frequency of laser 12, with the spectral components spatially dispersed (or, colloquially "spread," or "fanned out") according to frequency, with the optical intensities of the spectrally dispersed beams corresponding to the magnitude of the respective frequency component in the modulated optical signal. Stated alternatively, Bragg cell 24 amplitude and frequency modulates beam 17 and wave 22 together, and disperses the modulated beam in a Fourier manner, with angle of deflection corresponding to frequency, and optical intensity corresponding to spectral magnitude.) Three such dispersed beams $26_a$, $26_b$, $26_c$ are illustrated in FIG. 1, each representing different frequency component of the optical signal deflected by wave 22.

Beams $26_a$, $26_b$, $26_c$ are directed to propagate parallel to each other by Fourier lens 28, and directed to spatial light modulator 32 as focused beams $30_a$, $30_b$, $30_c$. Modulator 32 has a linear array of optical gates, or channels, $32_n$ whose transmissivity is controllable by programmable processor 31. Modulator 32 is disposed so that each channel will receive beams from Bragg cell 24 corresponding to a specific frequency band. The channels $32_a$, $32_b$, $32_c$ are disposed spatially to receive beams $30_a$, $30_b$, $30_c$, respectively. In FIG. 1, channels $32_a$ and $32_b$ are illustrated as bright, and channel $32_c$ dark, to indicate that processor 31 holds channels $32_a$ and $32_b$ open optically so that beams $30_a$ and $30_b$ will pass through modulator 32, whereas processor 31 holds channel $32_c$ opaque to prevent transmission of beam $30_c$. By programming processor 31 to hold channels corresponding to undesired bandwidths opaque, one effectively filters from the output of modulator 32 undesired interfering signals.

The desired output exits modulator 32 as spatially dispersed beams $34_a$, $34_b$, which focusing lens 36 collects and focuses onto device 40. Arm 52 of device 10 receives portion 18 of laser input beam 14, and directs it via relay mirrors 48, 46 and relay lens 44 to device 38. Device 38 can be any appropriate optical device which can permit focused output 34 of modulator 32, and reference beam 18, to copropagate, for example a beam splitter, or merely a simple optically transmissive plate. In theory, device 38 could even be a broadband optical fiber. In this manner, arms 50, 52 of device 10 constitute the respective arms of a Mach-Zender interferometer, and the interfering of focused beam 34 and reference beam 18 heterodynes the two, the effect of which is removal from beam 34 the optical carrier signal from laser 12, leaving only the RF signal received at antenna 20, less the frequency band corresponding to channel $32_c$ of spatial light modulator 32, which is transduced into an electronic signal by detector 40, which can be a simple photocell, phototransistor, or the like. This electronic signal is available for ultimate retransmission by antenna 41, which effectively repeats the RF signal received by antenna 20, with clutter removed.

In operation, laser 12 constantly illuminates Bragg cell 24. In the absence of signal at antenna 20, no acoustic waves 22 traverse cell 24; consequently no deflection of beam 17 occurs and no portion of beam 17 reaches Fourier lens 28 or spatial light modulator 32, and the output at 40 is zero. In the presence of a pulse at antenna 20, a corresponding acoustic pulse is injected into cell 24 and propagates across light beam 17. So long as the acoustic pulse and light 17 interact, system 10 will operate as described above; upon the pulse propagating past light 17, output at 40 will again cease. The result is a repeated pulse at 40, 41 of the same signature and duration as the pulse received at antenna 20.

In principle, one could practice the invention with any known spatial disperser, even a simple prism, coupled with an electrooptic transducer, and with any beam blocker, e.g. a shuttered plate, or, if one would not want to change the frequency response of modulator 32, a surface with precut openings. However, as an electronic countermeasure, the combination of a Bragg cell and an optical spatial light modulator is preferred because of their response speed, bandwidth, etc., and because Bragg cells are well-known and well understood, and the scientific has a great deal of experience with them. This, however, would not preclude newer technologies to perform the Bragg cell's functions, such as magneto-optic modulators, or electro-optic modulators. Furthermore, because a military force does not necessarily know beforehand what frequencies will be of interest, and what will be interference, in any engagement, modulator 32 should be computer programmable, as with processor 31.

Figure 2:
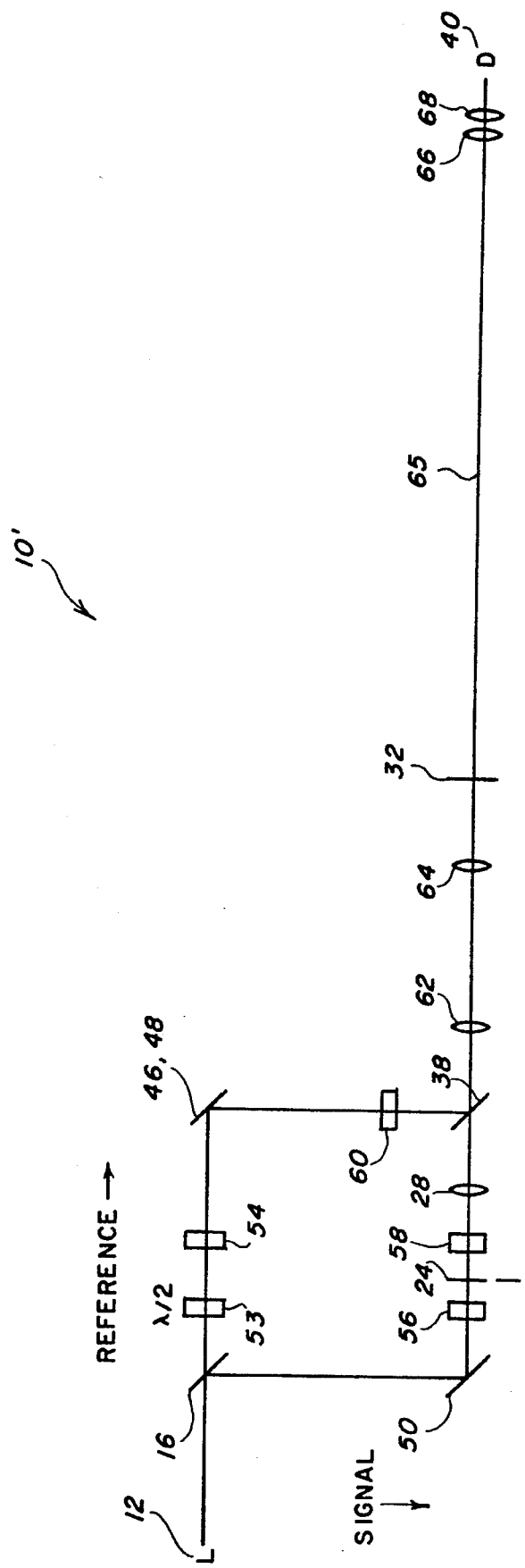
FIG. 2 is a plan diagram showing a system according to the invention used in proof of principle tests.

FIG. 2 shows an experimental setup used to perform proof of principle tests. Apparatus 10' is like apparatus 10 of FIG. 1, save that the optical carrier is combined with the reference beam before the spatial light modulator 32 at beamsplitter 38, rather than downstream of it. A laser diode 12, with associated collimating optics (a 2.92 mm focal length collimating lens-not shown) is split into signal and reference components by beam splitter 16. Operative specifications for the laser-lens combination used are given below in table I. The combination resulted in a collimated beam with an elliptical cross section of width (radial distance from beam center to the beam's $e^{-2}$ intensity level) of 0.44 mm in the horizontal direction (i.e. in the plane of FIG. 2), and 1.44 mm in the vertical direction (perpendicular to the plane of FIG. 2). The signal beam propagated 300 mm to Bragg cell 24 where its horizontal beam width, w, had spread through diffraction to 0.51 mm. The center of the beam was positioned on Bragg cell 24, 1.02 mm from the electro-acoustic transducer (not shown).

Cylindrical lenses 56, 58 (each having a 25 mm focal length) respectively, focused the signal beam into the Bragg cell normal to the plane of FIG. 2, and recollimated the deflected beam. The undeflected beam was stopped with a beam block shortly after the Bragg cell. The applied RF bandwidth was channelized onto continuous spatially dispersed beams by Bragg cell 24. Lens 28 (60 mm focal length acromat) Fourier transformed the deflected beam pattern and displayed it as focused spots along a horizontal line segment at beamsplitter 38. The line length of the beam segment at the Fourier plane of lens 28 that corresponded to the full desired bandwidth (500 MHz in this test) was 6.04 mm. The line length was determined by lens 28. The maximum deflected beam angles was ±2.88 degrees. The full bandwidth focal plane length of 6.04 mm was less than the 6.25 mm needed to span 25 pixels of spatial light modulator 32. The 500 MHz bandwidth corresponded slightly less than 25 channels (24.2 specifically) of 20 Mhz each. The focal length of lens 28 was chosen to be a commercially available lenses having focal lengths near 62.1 mm, which would distribute an input signal of 500 Mhz across and within a corresponding 25 pixels of modulator 32. By so doing, one can avoid the need for a custom Fourier lens for manufacture of the system.

In order to efficiently heterodyne at detector 40, the signal and reference beams had to overlap at beamsplitter 38 and subsequently co-propagate. Lens 28 telecentrically imaged the Bragg cell 24 onto beamsplitter 38, i.e. lens 28 was positioned one focal length after Bragg cell 24, and one focal length before beamsplitter 38. Telecentric imaging assured that each deflected beam propagated parallel to the optic axis at the focused image. The reference beam was vertically focused to a horizontal line at beamsplitter 38 with cylinder lens 60 (focal length 60 mm). The reference beam was positioned to overlap and span the signal beams using mirror 48 and the vertical position of lens 60, and was directed to co-propagate with the signal beam using a tilt adjustment of beamsplitter 38. This arrangement disposed the two beams coincident, and copropagating, optically downstream of beamsplitter 38.

Lenses 28, 62 telecentrically imaged Bragg cell 28 onto spatial light modulator 32. Like lens 28, lens 64 was of 60 mm focal length acromat. In this context, telecentric imaging implies that the chief rays of the beams exiting each channel of modulator 32 and parallel to the optical axis of modulator 32. Divergence between the beams deflected by Bragg cell 24 onto modulator 32 was thereby minimized, which also minimized the clear aperture required of subsequent optics.

The combination of lenses 66, 68 imaged spatial light modulator 32 onto photodetector 40. This lens combination formed a 25 mm focal length lens with an 18 mm clear aperture, i.e. f-number 1.4. This low f-number was needed to collect all the light exiting modulator 32. lens 66 was a 50 mm focal length acromat, and lens 68 was a 79 mm focal length meniscus lens. This combination was used because a single acromat with this f-number was not commercially available. To assure that the detector collected all the light, light in beam 65 was focused onto a 0.4 mm light spot on the 0.5 mm diameter photodetector 40. Imaging modulator 32 onto a 0.4 mm light spot required a −0.66 reduction.

The reference path contained two additional components: half wave plate 53 and prism beam expander 54 having a horizontal magnification of 18. Half wave plate 53 rotated the reference beam polarization by 90 degrees to an axis parallel to the polarization of the deflected beam exiting the Bragg cell. The signal and reference beam polarizations were aligned at photodetector 40 for maximum heterodyne detection efficiency. Two sets of beam expanding prisms 54 enlarged the reference beam eighteen fold for uniform illumination (to 3 dB) across the active pixels of modulator 32.

Laser 12 was a Spectra-Diode, 100 mW, laser diode (model number SDL-5412-H1), and was selected for its commercial availability, for its single longitudinal and transverse modes, and for its power. Laser 12 was a single mode, single facet, quantum well device, which permitted single longitudinal and single spatial mode uniform emission over its lasing area. Laser 12's parameters relevant to system design were:

TABLE I

| Optical Power (mW): | 100 |
|---|---|
| Wavelength (nm) | 830 |
| Line Width (nm) | 0.08 |
| FWHM Vertical Divergence angle (Degrees) | 30 |
| FWHM Horizontal Divergence Angle (Degrees) | 10 |
| Coherence length (m) | 1 |

FWHM means "full wave, half maximum," the length over which the beam falls off the half its maximum intensity.

Bragg cell 12 of FIG. 2 was built for the tests. The bandwidth of the Bragg cell limits the system's overall bandwidth, and accounts for a significant fraction of the system's insertion loss. Bragg cell parameters relevant to system design were:

TABLE II

| Optical Wavelength (nm) | 830 |
|---|---|
| RF Bandwidth (Hz) | 750–1250 |
| Efficiency (Power out per RF input power, in %) | 15 |
| Interaction Length (μsec) | 0.6 |
| Spurious Free Dynamic Range (dB) | 50 |
| Spectral Variation (dB) | 2 |

The spurious free dynamic range is the range which, upon driving the Bragg cell, is free of spurious signals. The spectral variation is the amount the cells' output would vary at constant power for signals within the recited RF bandwidth. The Bragg cell's maximum optical throughput, a product of the cell's efficiency and the cell's maximum RF power, was 7.5% of incident optical beam power.

The Bragg cell used a gallium phosphide crystal as the acousto-optical medium, and had a lithium niobate transducer. The transducer was fabricated as a phased array which generated a self collimating shear wave. This design provides sufficient acousto-optic diffraction efficiency across the RF bandwidth of interest. The total angular diffraction was ±2.880°.

Two types of commercially available spatial light modulators were considered: ferro-electric liquid crystal (FELC) based, and magneto-optic (MO) based. The FELC is available as a linear array, and is especially valuable for high speed shuttering. The MO device is available only as an array area. Tradeoff parameters between these two technologies relevant to system design were:

TABLE III

|  | FELC | MO |
|---|---|---|
| Transmissivity (%) | 70 | 5 |
| Contrast (dB) | 20 | 40 |
| Array Size (Pixels) | 1 × 64 | 48 × 48 |
| Field of View (Degrees) | ±20 | ±2.5 |
| Response Time (μsec) | 100 | 4 |
| Pixel Width (mm) | 0.250 | 0.125 |
| Inactive Length (mm) | 0.025 | 0.016 |

Where inactive length is effectively the space between pixel cells. The FELC device was used in the test apparatus, discussed above, due in large part because of its dynamic range. The 100 μsec response time of the FELC was adequate to the needs of the test; subsequent application can use custom FELC devices which can run much faster. Photodetector 40 was selected primarily on the basis of two parameters: maximum video bandwidth and active photodetector diameter. Video bandwidth was required to exceed the 1250 MHz upper frequency of the Bragg cell. A large active photodetector diameter allows using a lower f-number lens to focus modulator 32 onto detector 40. To illustrate, consider that the 6.25 mm line corresponding to 25 active pixels is considerably larger than the diameter of a wide bandwidth photodetector. To image modulator onto photodetector 40, focusing lenses 66, 68 must be positioned for a large image reduction. That is, imaging lens combination 66, 68 was positioned several focal lengths in front of modulator 32, and slightly more than one focal length behind detector photodetector 40. The spot on detector 40 was determined by the ratio of the distance between it and the lens combination 66, 68, and the distance between modulator 32 and lens combination 66, 68. However, increasing the distance between modulator 32 and lenses 66, 68 results in channel beam spreading at the lenses, and would require a larger clear aperture and lower f-number output focusing lenses. Selecting a commercial detector with the largest diameter, consistent with the video bandwidth, reduces the complexity of designing the imaging lens(es). Detector 40 was an Antel model AR-S1. Its parameters relevant to system design were:

TABLE IV

| Diameter (μ) | 500 |
|---|---|
| Video Bandwidth (GHz) | 1.7 |
| Capacitance (pF) | 2.5 |
| Dark Current (Na) | 2 |
| Responsivity (A/W) | 0.63 |
| Noise Equivalent Power (W/Hz$^{1/2}$) | <5(10)$^{-11}$ |

The 500μ diameter was sufficiently large to permit use of a commercial lens combination for imaging. The noise equivalent power is that optical input power that will produce an output signal into a 50 ohm load at al level equal to thermal noise power. The 2 nA detector dark current produced an output noise which was negligible compared with thermal noise.

The tests were run with the apparatus of FIG. 2, with the addition of an additional half wave plate before modulator 32 because maximum modulator contrast is polarization dependent. Apparatus 10' was swept by an RF signal from 750 to 1250 Mhz. Detector output was amplified and displayed as a function of frequency on a commercial network analyzer. FIGS. 2–6 show results presented on the network analyzer.

Figure 3:
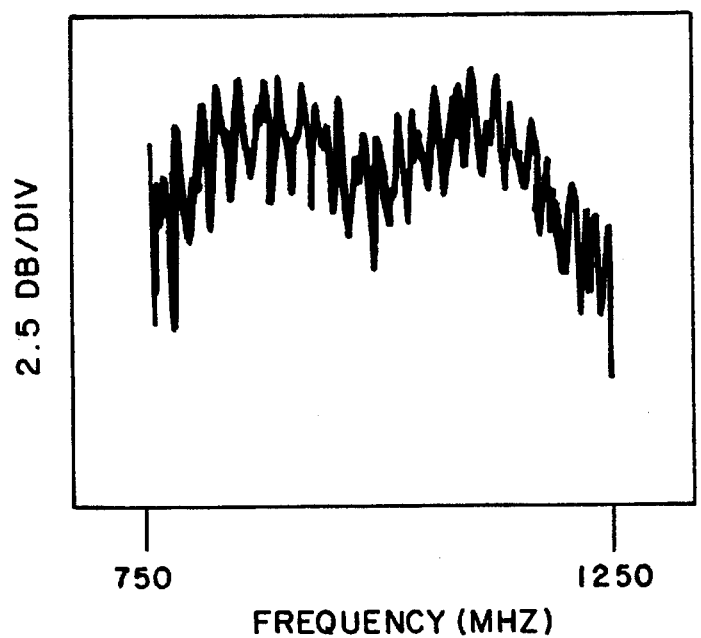
FIG. 3 through 6 are graphs showing data generated in the proof of principle tests.
Figure 4:
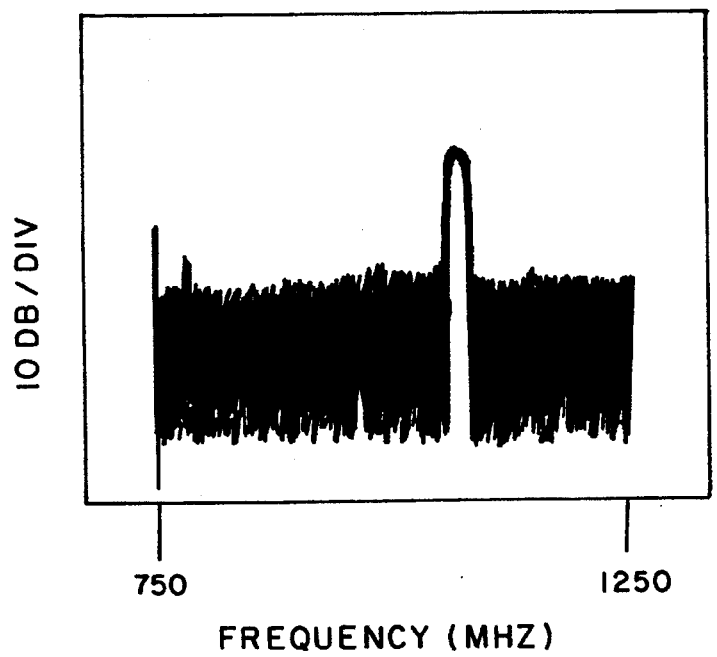
Figure 5:
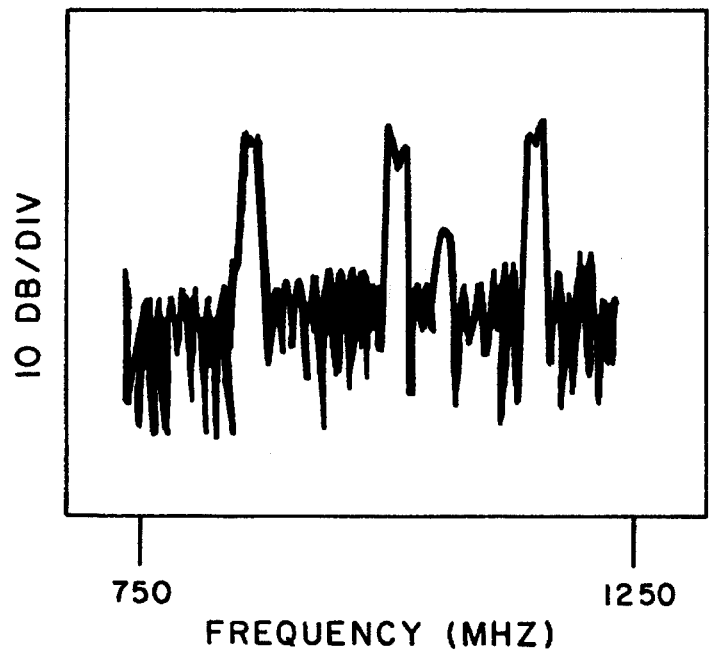
Figure 6:
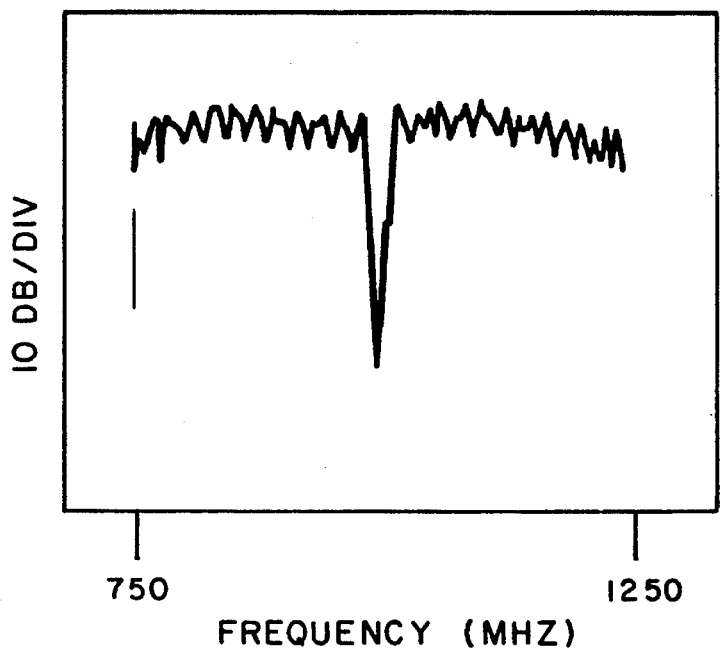

FIG. 3 shows system output when all channels of modulator 32 transmitted, and is in effect a calibration curve of system 10'. FIG. 4 shows system output when all but one channel of modulator 32 was blocked. FIG. 5 shows similarly shows system output when four channels transmitted, and the rest did not. FIG. 5 shows system output when all but one channel was transmitting.

The invention has been described in what is considered to be the most practical and preferred embodiments. It is recognized, however, that obvious modifications to these embodiments may occur to those with skill in this art. Accordingly, the scope of the invention is to be discerned from the appended claims, wherein:

We claim:

1. A filter comprising:

means for receiving an input signal;

means for spatially dispersing said input signal according to frequency, to form a spatially dispersed optical signal; and means for combining selected frequency components of said spatially dispersed signal into a resultant filtered signal;

wherein said filter comprises means for repeating said filtered signal.

2. The filter of claim 1, wherein:

said means for spatially dispersing comprises a Bragg cell;

said means for receiving comprises a means for injecting said input signal into said Bragg cell as a corresponding acoustic signal; and wherein said filter comprises an optical source, said Bragg cell being disposed to receive light from said source effective to cause said acoustic signal and light from said optical source to produce said spatially dispersed optical signal.

3. The filter of claim 2, wherein said filter comprises:

a Mach-Zender interferometer, one arm of said interferometer comprising said Bragg cell, the other arm of said interferometer carrying an optical reference signal referenced to said light from said source received by said Bragg cell; and means for heterodyning together light which has passed through said Bragg cell and said reference signal.

4. The filter of claim 3, wherein said input signal is an electromagnetic signal, and said means for receiving is adapted to transduce said electromagnetic signal into said acoustic signal.

5. The filter of claim 4, wherein said means for combining comprises a spatial light modulator adapted to receive said spatially dispersed optical signal, and to pass said selected frequency components.

6. The filter of claim 5 wherein, said means for combining comprises a means, responsive to said spatial light modulator, for recombining said selected frequency components to form said filtered signal.

7. The filter of claim 1, wherein said means for combining comprises a spatial light modulator adapted to receive said spatially dispersed optical signal, and to pass said selected frequency components.

8. The filter of claim 7, wherein said means for combining comprises a means, responsive to said spatial light modulator, for recombining said selected frequency components to form said filtered signal.

9. A method of filtering a signal comprising:

receiving an input signal;

spatially dispersing said input signal according to frequency, to form a spatially dispersed optical signal; and combining selected frequency components of said spatially dispersed signal into a resultant filtered signal;

wherein said method comprises repeating said filtered signal.

10. The method of claim 9, wherein:

said receiving comprises injecting said input signal into a Bragg cell to form a corresponding acoustic signal in said Bragg cell; and said Bragg cell is disposed to receive light from an optical source effective to cause said acoustic signal and light from said optical source to produce said spatially dispersed optical signal.

11. The method of claim 10, wherein said method comprises:

placing said Bragg cell into one arm of a Mach-Zender interferometer;

injecting an optical reference signal referenced to said light from said source received by said Bragg cell into the other arm of said interferometer; and heterodyning together light which has passed through said Bragg cell and said reference signal.

12. The method of claim 11, wherein said input signal is an electromagnetic signal, and said receiving comprises transducing said electromagnetic signal into said acoustic signal.

13. The method of claim 12, wherein said combining comprises disposing a spatial light modulator to receive said spatially dispersed optical signal effective to pass said selected frequency components.

14. The method of claim 13, wherein said combining comprises, responsive to said spatial light modulator, recombining said selected frequency components to form said filtered signal.

15. The method of claim 9, wherein said combining comprises using a spatial light modulator adapted to receive said spatially dispersed optical signal, and to pass said selected frequency components.

16. The method of claim 15, wherein said combining comprises using a means, responsive to said spatial light modulator, for recombining said selected frequency components to form said filtered signal.

* * * * *